United States Patent
Kreiselmaier

(10) Patent No.: US 11,708,497 B2
(45) Date of Patent: Jul. 25, 2023

(54) USE OF SIO2 COATINGS IN WATER-CARRYING COOLING SYSTEMS

(71) Applicant: Coattech SA, Sierre (CH)

(72) Inventor: Thomas Kreiselmaier, Venthone (CH)

(73) Assignee: Coattech SA, Sierre (CH)

( * ) Notice: Subject to any disclaimer, the term of this patent is extended or adjusted under 35 U.S.C. 154(b) by 200 days.

(21) Appl. No.: 16/478,050

(22) PCT Filed: Jan. 18, 2018

(86) PCT No.: PCT/EP2018/051203
§ 371 (c)(1),
(2) Date: Jul. 15, 2019

(87) PCT Pub. No.: WO2018/134302
PCT Pub. Date: Jul. 26, 2018

(65) Prior Publication Data
US 2020/0123394 A1 Apr. 23, 2020

(30) Foreign Application Priority Data
Jan. 18, 2017 (DE) .................. 10 2017 100 946.9

(51) Int. Cl.
| | | |
|---|---|---|
| *C09D 5/08* | (2006.01) | |
| *B05D 1/02* | (2006.01) | |
| *B05D 3/00* | (2006.01) | |
| *B05D 7/22* | (2006.01) | |
| *B05D 7/24* | (2006.01) | |
| *B05D 7/00* | (2006.01) | |
| *B08B 9/032* | (2006.01) | |
| *C09D 1/00* | (2006.01) | |
| *C09D 5/00* | (2006.01) | |
| *C09D 163/00* | (2006.01) | |
| *F28F 21/00* | (2006.01) | |

(52) U.S. Cl.
CPC .............. *C09D 5/08* (2013.01); *B05D 1/02* (2013.01); *B05D 3/002* (2013.01); *B05D 7/225* (2013.01); *B05D 7/24* (2013.01); *B05D 7/5483* (2013.01); *B08B 9/0321* (2013.01); *C09D 1/00* (2013.01); *C09D 5/002* (2013.01); *C09D 163/00* (2013.01); *F28F 21/006* (2013.01)

(58) Field of Classification Search
CPC . C09D 5/08; C09D 1/00; C09D 5/002; C09D 163/00; B05D 1/02; B05D 3/002; B05D 7/225; B05D 7/24; B05D 7/5483; B08B 9/0321; F28F 21/006
See application file for complete search history.

(56) References Cited

U.S. PATENT DOCUMENTS

| | | | |
|---|---|---|---|
| 6,403,164 B1 * | 6/2002 | Jonschker | ................ C09D 4/00 427/387 |
| 9,006,141 B2 * | 4/2015 | Schwindt | ............... A01N 25/34 504/116.1 |

FOREIGN PATENT DOCUMENTS

| | | | | |
|---|---|---|---|---|
| CN | 103881494 A | 6/2014 | | |
| CN | 103965671 A | 8/2014 | | |
| CN | 105937666 A | 9/2016 | | |
| WO | WO-9529375 A1 * | 11/1995 | ............. | F28F 19/04 |
| WO | WO-2012045466 A1 * | 4/2012 | ............. | F28G 9/00 |

OTHER PUBLICATIONS

English translation of WO2012045466.*
English translation of WO9529375.*
Neuhaus "Mitigating Waterborne Diseases in Cooling Systems" published Dec. 2016 accessed online at https://www.watertechonline.com/process-water/article/16210818/mitigating-waterborne-diseases-in-cooling-systems.*
Turetgen "Reduction of microbial biofilm formation using hydrophobic nano-silica coating on cooling tower fill material" Water SA vol. 41, No. 3 Apr. 2015 pp. 295-299.*
PCT International Search Report dated Apr. 11, 2018 in connection with PCT/EP2018/051203.

* cited by examiner

*Primary Examiner* — Robert S Walters, Jr.
(74) *Attorney, Agent, or Firm* — Brooks Kushman P.C.

(57) ABSTRACT

The invention relates to the use of coatings of nanoscale $SiO_2$ particles in water-carrying cooling systems to prevent abrasive corrosion and depositions as well as to a method for the production of such a coating.

7 Claims, No Drawings

USE OF SIO2 COATINGS IN WATER-CARRYING COOLING SYSTEMS

The invention relates to the use of coatings of nanoscale $SiO_2$ particles in water-carrying cooling systems to prevent abrasive corrosion and deposits as well as to a method for coating cooling water tubing/piping with the aid of such particles. Coatings of such type are particularly useful in cooling systems of water-cooled thermal power plants.

Cooling water systems of thermal power plants are most often operated with surface water taken from surrounding areas, i.e. using river water and seawater. Due to the suspended matter and dissolved substances contained in the cooling water, these plants and systems are exposed to a multitude of external influences, in particular must withstand mechanical, chemical and electrochemical stresses.

Mechanical stresses are encountered as a result of solid particles carried along by the cooling medium, for example sand. Chemical stresses result from the nature of the cooling medium, for example whether the medium contains salts, basic or acidic substances. In particular the well known corrosive effect of seawater or severely contaminated river water used for cooling purposes is to be mentioned here.

In this respect, electrochemical or galvanic corrosion refers to corrosion hazards that occur through the formation of galvanic elements on metallic interfacial surfaces, especially in the transitional area between tubesheet and coolant tubes, said corrosion being significantly intensified by electrically conductive fluids, for example seawater or saline river water.

In addition, there are thermal stresses which are the result of the temperature difference arising between the cooling medium and the steam to be condensed, which may well exceed 100° C., and which lead to mechanical stress especially in the area where the coolant tubes are rolled into the tubesheet. Moreover, increased temperatures may increase the corrosive effect of acids, salts, and other dissolved substances.

Moreover, there are impairments to the functionality of steam condensers due to deposits of undesirable substances, algae formation, etc. in the tubes, which are particularly promoted by areas of roughness, such as those caused by corrosion. The consequence of this is that the corrosion and deposition phenomena not only accelerate with the operating time of a steam condenser, they even aggravate because of the ever-increasing number of already existing corrosion and deposition starting points.

For that reason, efforts were made at an early stage to provide steam condensers with a corrosion-inhibiting coating of plastic material. In particular, coatings based on epoxy resin have been in use here. Initially, primarily the tubesheets were provided with such a coating but this approach could not solve the specific problems associated with the occurrence of corrosion and deposits inside the tubes. At a later date, coatings were also applied to the tube inlet and outlet areas with a view to protecting this especially endangered transitional region. Measures of the kind mentioned above are known for example from GB-A-1 125 157, DE 1 939 665 U, DE 7 702 562 U, EP 0 236 388 A as well as EP 94 106 304 A.

For a long time, the internal coating of coolant tubing caused a problem due to the considerable length and small diameter of the lines, but this has been solved in the meantime. In this respect, reference can be made to WO 97/197058 A1 and WO 2012/045466 A1. The devices described there enable the application of coatings to the inner wall of coolant lines by means of a controlled application system and a special coating nozzle.

Coatings based on epoxy resin-amine hardener systems are described for example in WO 95/29375 A1.

The conventional coating of cooling water systems by means of plastic materials has proven itself in principle, but requires revision at regular intervals. In many cases, it has been shown that abrasive corrosion occurred that extended into the metal of the coated coolant tube, especially when operating on aggressive cooling water. When favorable thermal conditions exist, biological growths also occur rather often. Moreover, mineral deposits are also frequently encountered with correspondingly contaminated cooling water. This means that the coolant tubes have to be cleaned and recoated. In particular, the known plastic compounds are not suitable for withstanding abrasive corrosion over long periods of time.

For that reason, there is a need to coat water-carrying cooling systems and in particular coolant tubes in such a way that they have a longer service life and offer better protection against abrasive corrosion as well as against deposits. In particular, such a coating should not unduly impair the thermal conductivity of the tube walls to which the coating is applied.

This objective is achieved with the use of a nanoscale $SiO_2$ coating, as first mentioned above.

Within the meaning of the present invention, abrasive corrosion is defined as any type of corrosion that leads to the removal and degradation of the walls of cooling systems.

The nanoscale $SiO_2$ particles used as proposed by the present invention form a thin silicon dioxide layer of 500 nm, preferably between 50 and 300 nm, on the surface treated with said particles. This is not to be considered a conventional protection measure to prevent oxidation; oxide layers are in many ways suitable to protect the underlying metal against further corrosion attack. Rather, the coating in fact seals the surface, prevents adhesion and slows down abrasive corrosion due to its hardness.

Whenever reference is made to deposits, this is meant to include both mineral and biological deposits which are conducive to slowing down or preventing the flow of the coolant in cooling systems and, furthermore, impede the heat transfer through the walls of the cooling system.

In and of themselves, coatings made of nanoscale $SiO_2$ particles are known. They are used, for example, for the coating of mineral and biological surfaces with a view to making them dirt-repellent. With the help of such coatings an effective graffiti protection can be achieved, but also, by incorporating biocidal active substances, plant protection measures can be taken. The coatings are produced by applying an aqueous sol-gel that contains $SiO_2$ particles, with the $SiO_2$ particles usually having a size of less than 10 nm. Examples of this are found in publications EP 1 826 248 A1 and DE 10 2007 060 320 A1, which also describe the production of sol-gels on the basis of silanes. Specific and express reference is made to these production processes.

The aqueous coating solutions are applied in particular by spraying. In this respect, the film thickness is less than 500 nm and as a rule lies in the range of between 50 and 300 nm, especially in the range of 80 to 150 nm. It has been found that larger film thicknesses are difficult to achieve because the hydrophilic and hydrophobic properties of these layers also impede and limit the adhesion of the same material as soon as the applied aqueous solution has consolidated into a solid layer. It is assumed that association and polymerization processes take place during application, which result in a pore-free covering of the coated surface.

The coated surfaces have proven to be largely inert to mechanical, chemical and electrochemical stress. Due to the hydrophilic and hydrophobic properties of the coatings, the adhesion and deposition of both mineral and biological materials is severely impeded, so that the surfaces coated in this way remain free of obstructions and the fluid can pass through the coolant lines unhindered for a long period of time. The coatings are pore-free so that they reliably protect the underlying metal base material (or primer coats) and do not significantly affect the thermal conductivity of a wall to which such a coating has been applied.

The coating can in particular be applied conducively to water-conducting coolant lines, but it may as well be used on other components of a cooling system, for example tubesheets, valves, pumps and the like. In principle, such a coating of nanoscale $SiO_2$ particles can be used in all water-conducting systems, i.e., for example, in water pipes/tubes, heat exchangers, heating systems, instantaneous water heaters, sewage treatment plants, water treatment plants, desalination plants, and especially also in the supply lines and similar systems.

The coatings applied as proposed by the present invention can also be used for the inertization of surfaces, also and especially of coolant lines, which are employed in seawater desalination plants operating according to the flash evaporation principle.

Before application of the nanoscale $SiO_2$ particles takes place, it may be expedient to apply a primer coat, especially if the cooling water systems to be coated are of older age and already show signs of corrosion, so that it makes sense to fill up corroded areas. For this purpose, epoxy amine hardener systems have proven themselves, as described for example in publication WO 95/29375 A1. Such a prime coating can be applied in several layers, with the film thickness in coolant lines as a rule being at least 80 µm and may reach 2000 µm or more on tubesheets. Coatings in the range of between 80 µm and 250 µm are usually useful for coolant lines.

The invention also relates to a method for applying the coating proposed by the invention to cooling water lines, said method comprising the following steps:
(a) Cleaning the lines with water under high pressure,
(b) if considered necessary or expedient, the application of a primer coat, and
(c) application of an aqueous sol-gel consisting of nanoscale $SiO_2$ particles which consolidate on the surface to form an $SiO_2$ layer.

As a rule, the coating is applied by spraying.

Cleaning of the lines with water is carried out under high pressure, with pressures of up to 2500 bar being used. For example, publication WO 2012/045466 A1 proposes and describes a cleaning system provided with a backward jetting nozzle which is operated in reverse travel mode and has a spraying angle of between 60° and 120° to the longitudinal direction of the coolant tube. Such a nozzle, which can be used not only for cleaning purposes but also for the application of coating materials, offers the advantage that the material removed by the cleaning process is discharged with the water stream, resulting in the coating process not being disturbed and the coat not being damaged by the movements of the nozzle and application hose.

A single layer of the material used in accordance with the invention which is applied in a single work step is sufficient.

The application of a priming coat is primarily useful for the treatment of older coolant tubes that already show signs of corrosion and pitting. For the primer coating, that may consist of and be applied in one or several layers, the material described hereinbefore based on an epoxy resin-amine hardener system is particularly appropriate. The film thicknesses of the primer coating are as indicated above for the tube coating.

Application of the aqueous sol-gel takes place by spraying to produce the $SiO_2$ layer, for which purpose the nozzle described above can be used, said nozzle, however, being operated at considerably lower pressures. Normally, the application pressure for the primer coating is up to 500 bar, but for the application of the sol-gel only up to about 10 bar.

Details of the coating device and the coating process are described in publication WO 2012/045466 A1, the teaching of which is expressly included here.

The invention claimed is:

1. Method for the coating of cooling water lines in cooling systems of water-cooled thermal power plants comprising the following steps
   (a) cleaning the cooling water lines with water under high pressure;
   (b) applying an epoxy resin amine hardener system as a primer coat; and
   (c) applying an aqueous coating composition that comprises nanoscale $SiO_2$ particles having a size of less than 10 nm, which consolidate on the surface to form an $SiO_2$ layer of <500 nm.

2. Method according to claim 1, characterized in that the cleaning is carried out at a pressure of up to 2500 bar.

3. Method according to claim 1, characterized by the application of a primer coating at a pressure of up to 500 bar.

4. Method according to claim 1, characterized by the application of the coating composition at a pressure of up to 10 bar.

5. Method according to claim 1, characterized in that the cleaning of the cooling water lines as well as the application of the primer coating and the application of the coating composition is carried out by means of a nozzle which is designed for use in reverse travel operation, the spray angle of which ranging between 60° and 120° to the longitudinal direction of the cooling water lines to be treated.

6. Method according to claim 1, characterized in that at least one primer coat is applied, the film thickness being in the range of between 80 µm and 2000 µm.

7. Method according to claim 1, characterized in that the film thickness of the $SiO_2$ layer lies in the range of between 50 and 300 nm.

* * * * *